(12) United States Patent
Hayashi

(10) Patent No.: US 7,012,640 B2
(45) Date of Patent: Mar. 14, 2006

(54) ELECTRONIC CAMERA HAVING FUNCTION FOR OPTIMIZING RECORDING OPERATION

(75) Inventor: Masaki Hayashi, Kawasaki (JP)

(73) Assignee: Nikon Corporation, Tokyo (JP)

(*) Notice: Subject to any disclaimer, the term of this patent is extended or adjusted under 35 U.S.C. 154(b) by 666 days.

(21) Appl. No.: 09/935,596

(22) Filed: Aug. 24, 2001

(65) Prior Publication Data

US 2002/0031349 A1 Mar. 14, 2002

(30) Foreign Application Priority Data

Aug. 29, 2000 (JP) .............................. 2000-259348

(51) Int. Cl.
*H04N 5/76* (2006.01)
*H04N 5/225* (2006.01)

(52) U.S. Cl. .................................. 348/231.99; 386/117

(58) Field of Classification Search ........... 348/231.99, 348/231.1, 231.2, 231.3, 231.4, 231.5, 231.6, 348/231.7, 231.8, 231.9; 711/170, 171, 172, 711/173, 115, 103; 386/117
See application file for complete search history.

(56) References Cited

U.S. PATENT DOCUMENTS

| 5,434,618 | A | * | 7/1995 | Hayashi et al. ........... 348/231.2 |
| 5,640,349 | A | | 6/1997 | Kakinuma et al. ...... 365/185.33 |
| 5,852,467 | A | * | 12/1998 | Ogino ...................... 348/231.1 |
| 6,031,964 | A | * | 2/2000 | Anderson .................... 386/117 |
| 6,449,426 | B1 | * | 9/2002 | Suga et al. .................. 386/117 |

FOREIGN PATENT DOCUMENTS

| JP | A-7-226095 | 8/1995 |
| JP | A-8-77066 | 3/1996 |

* cited by examiner

*Primary Examiner*—Wendy R. Garber
*Assistant Examiner*—Justin Misleh
(74) *Attorney, Agent, or Firm*—Oliff & Berridge PLC

(57) ABSTRACT

A data recorder includes a recording unit, a condition determining unit, and an optimizing unit. The condition determining unit performs a recording test or information acquisition on a recording medium, and determines from the result the right condition for performing a recording operation. The optimizing unit optimizes the recording operation according to the right condition. The recording unit performs the recording condition optimized by the optimizing unit, thereby recording data on the removable recording medium.

4 Claims, 4 Drawing Sheets

ELECTRONIC CAMERA HAVING FUNCTION FOR OPTIMIZING RECORDING OPERATION

BACKGROUND OF THE INVENTION

1. Field of the Invention

The present invention relates to a data recorder for recording data on a removable recording medium such as a COMPACT FLASH™.

The present invention also relates to an electronic camera that comprises the data recorder.

Furthermore, the present invention relates to a recording medium that stores a program for operating a computer as the data recorder.

2. Description of the Related Art

Conventionally, COMPACT FLASHES™ have been well known as media for storing data including images and music. These COMPACT FLASHES™ consist generally of an on-chip buffer for exchanging data with exterior, a flash memory for storing data in a nonvolatile fashion, and a control unit for performing data transfer between the on-chip buffer and the flash memory.

Such COMPACT FLASHES™ vary greatly with vendors and with products in the capacities of their on-chip buffers and the sequences of recording controls within the COMPACT FLASHES™.

For example, Japanese Unexamined Patent Application Publication No. Hei 7-226095 discloses a COMPACT FLASH™ having two on-chip buffers. Here, the two on-chip buffers can be switched alternately so that the accumulation of data into the on-chip buffers, which is originated from exterior, and the writing of data to the flash memory are performed simultaneously in parallel.

Moreover, Japanese Unexamined Patent Application Publication No. Hei 8-77066 discloses a COMPACT FLASH™ in which a plurality of on-chip buffers is provided for the sake of more efficient recording operations.

As stated above, COMPACT FLASHES™ vary greatly according to vendors and with products in the capacities of their on-chip buffers and the sequences of recording controls inside. Therefore, if an external data recorder and a COMPACT FLASH™ accidentally go out of recording operation timing, invalid latency can occur frequently. Such latency becomes a major cause of delay in completing recording operations.

Electronic cameras and data recorders, however, are very often used with unknown COMPACT FLASHES™ or new COMPACT FLASHES™. This makes it extremely difficult for the electronic cameras and data recorders to be fully adjusted to appropriate recording operation timing in advance.

SUMMARY OF THE INVENTION

In view of the foregoing, it is an object of the present invention to change the recording operation on the recorder side appropriately in response to a wide variety of recording media (such as a COMPACT FLASH™).

Hereinafter, description will be given of the present invention.

(1) A data recorder of the present invention comprises: a recording unit for recording data on a removable recording medium; a condition determining unit for determining a right condition for performing a recording operation with the recording unit according to a recording test performed on the recording medium; and an optimizing unit for optimizing the recording operation of the recording unit according to the right condition determined by the condition determining unit.

In the configuration described above, the condition determining unit performs a recording test on the recording medium, and determines the right condition for performing the recording operation from the test result. The optimizing unit optimizes the recording operation of the recording unit based on this right condition.

Therefore, the recording operation on the recorder side can be modified flexibly and appropriately in response to a variety of recording media (unknown recording media in particular). This consequently reduces the possibility of the recorder repeating recording operations despite the incompatibility between the recording media, and thereby promises such effects as reduction in recording time.

(2) Another data recorder of the present invention comprises: a recording unit for recording data on a removable recording medium; a condition determining unit for determining a right condition for performing a recording operation with the recording unit according to information acquisition from the recording medium; and an optimizing unit for optimizing the recording operation of the recording unit according to the right condition determined by the condition determining unit.

In the configuration described above, the condition determining unit determines the right condition for performing the recording operation from the information acquired from the recording medium. The optimizing unit optimizes the recording operation based on this right condition.

It follows that the recording operation on the recorder side is modified flexibly and appropriately in response to a variety of recording media (in particular, ones from which information having a high correlation to the right condition can be acquired). This consequently reduces the possibility of the recorder repeating recording operations despite the incompatibility between the recording media, and thereby promises such effects as an efficient reduction in recording time.

(3) Another data recorder of the present invention is the data recorder according to the foregoing paragraph (1) or (2), wherein: the recording unit includes a recording buffer for temporarily storing data yet to be output to the recording medium; and the optimizing unit optimizes the capacity of the recording buffer according to the right condition.

In the configuration described above, the capacity of the recording buffer on the data-recorder side is optimized in accordance with the right condition. This buffer capacity optimization makes it possible to optimize the timing of data transfer to the recording medium, the amount of data per transfer to the recording medium, and the like at the same time.

(4) An electronic camera of the present invention comprises the data recorder according to any one of the foregoing paragraphs (1) to (3), and a shooting unit for shooting a subject image to generate image data. The data recorder records image data generated by the shooting unit.

Typically, electronic cameras are loaded with a variety of recording media used in turns for the sake of storing image data and the like. The time to record data to these recording media governs the continuous shooting capability and the shooting maneuverability of the electronic cameras.

Thus, incorporating the data recorder of the present invention into an electronic camera allows immediate optimization of the recording operation on the electronic-camera side in response to recording media which are replaced in use.

Consequently, the electronic camera can be improved in capability to continously shoot or in shooting maneuvability.

(5) Another electronic camera of the present invention comprises: a shooting unit for shooting a subject image to generate image data; a continuous shooting memory for temporarily storing the image data yet to be completed of processing; and the data recorder according to the foregoing paragraph (3) for recording image data generated by the shooting unit. The optimizing unit included in the data recorder optimizes the capacity of the recording buffer by allocating an area of the continuous shooting memory to the recording buffer according to the right condition.

By the way, if a recording buffer is provided exclusively, the maximum capacity of the recording buffer must be estimated. Excluding some rare cases where the recording buffer is in full operation, most of the memories in the recording buffer will remain unused, bearing wasted memory areas all the time.

So, in the configuration described above, the capacity of the recording buffer is adjusted by utilizing some of the area in the continuous shooting memory for use by the recording buffer. This allows reduction of the area dedicated to the recording buffer (down to zero, in some cases). Moreover, when there is surplus in the capacity of the recording buffer, it can be effectively used as the original continuous shooting memory.

It is yet more preferable to have the optimizing unit in the foregoing configuration adjust and set the maximum number of continuous shots after determining the capacity of the continuous shooting buffer after the allocation of the memory area.

(6) Another electronic camera of the present invention comprises: a shooting unit for shooting a subject image to generate image data; a display memory for storing the image data for displaying purpose; and the data recorder according to the foregoing paragraph (3) for recording image data generated by the shooting unit. The optimizing unit included in the data recorder optimizes the capacity of the recording buffer by allocating an area of the display memory to the recording buffer according to the right condition.

If a recording buffer is provided exclusively, the maximum capacity of the recording buffer must be estimated. Excluding some rare cases where the recording buffer is in full operation, most of the memories in the recording buffer will remain unused, bearing wasted memory areas all the time.

So, in the configuraion described above, the capacity of the recording buffer is adjusted by utilizing some of the area in the continuous shooting memory for use by the recording buffer. This allows reduction of the area dedicated to the recording buffer (down to zero, in some cases). Moreover, when there is surplus in the capacity of the recording buffer, it can be effectively used as the original continuous shooting memory.

It is yet more preferable to have the optimizing unit in the foregoing configuration adjust and set the maximum number of continuous shots after determining the capacity of the continuous shooting buffer after the allocation of the memory area.

(7) A recording medium of the present invention contains a program for operating a computer as the recording unit, the condition determining unit, and the optimizing unit according to any one of the foregoing paragraphs (1) to (3). This computer comprises in advance the hardware function of recording data on a removable recording medium.

The program in the above-described recording medium can be executed on this computer to realize the data recorder according to any one of the foregoing paragraphs (1) to (3) on the computer.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DETAILED DESCRIPTION OF THE PREFERRED EMBODIMENT

<<Configuration of the Embodiment>>

Figure 1:
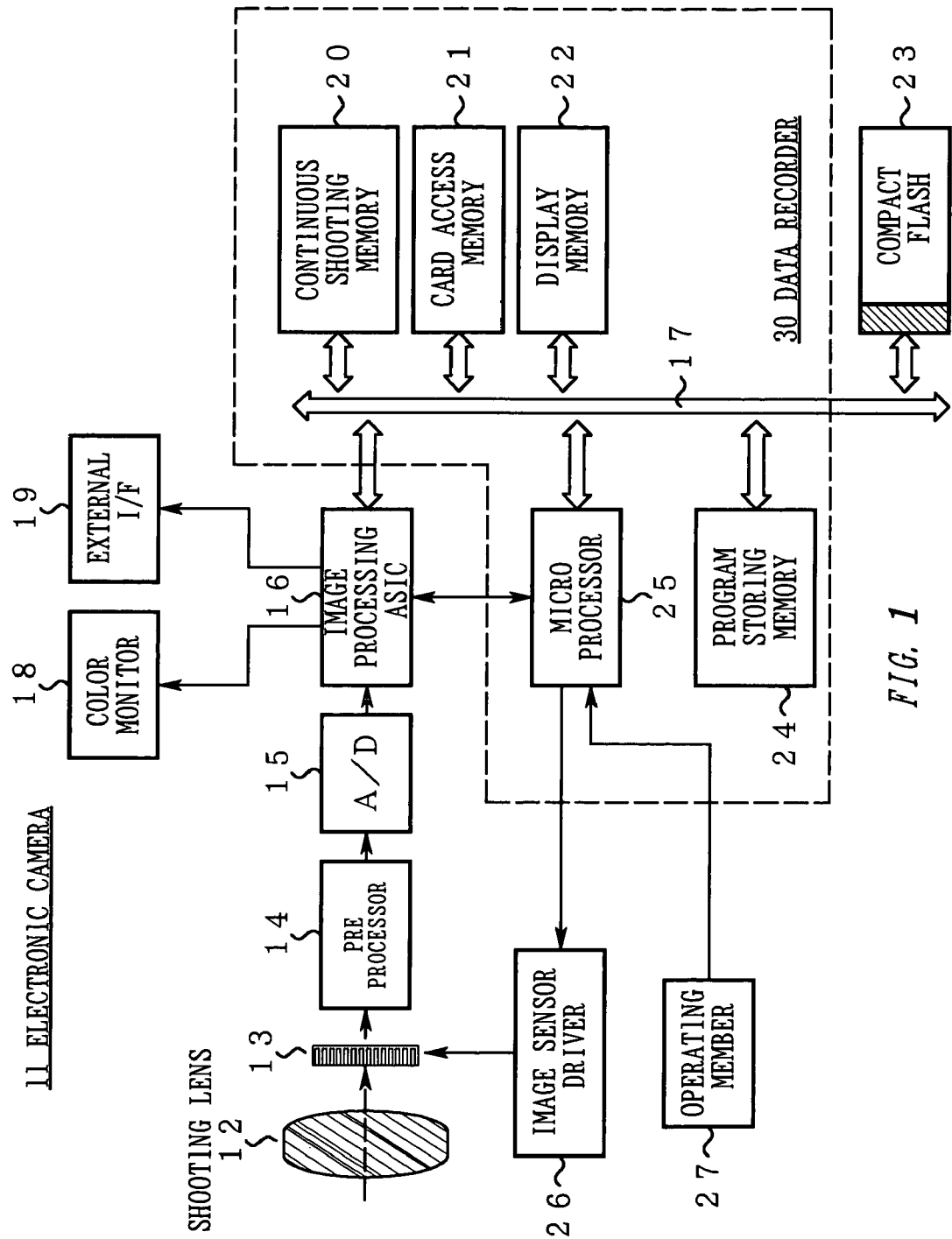
FIG. 1 is a block diagram showing the configuration of the present embodiment.

FIG. 1 is a block diagram showing the configuration of the present embodiment.

In FIG. 1, a shooting lens 12 is mounted on an electronic camera 11. The imaging plane of an image sensor 13 is placed in the image space of this shooting lens 12. Image data output from this image sensor 13 is digitized through a preprocessor 14 and an A/D conversion unit 15 before input to an image processing ASIC (application specific IC) 16.

This image processing ASIC 16 includes a two-dimensional image process circuit for image data, a JPEG compression process circuit for image data, and a monitor display circuit. The input/output port of this image processing ASIC 16 is connected to a bus 17. The image processing ASIC 16 is also connected with a color monitor 18 for displaying monitor images, an external interface 19 for exchanging data with external devices, and so on.

Meanwhile, the bus 17 is connected with a continuous shooting memory 20, a card access memory 21, a display memory 22, a COMPACT FLASH™ 23, a program storing memory 24, a microprocessor 25, and so on.

Of these, the continuous shooting memory 20 is a memory to which image data yet to be completed of processing by the image processing ASIC 16 (image data yet to be processed, image data in process, or the like) is saved temporarily so that consecutive shooting operations are performed as continuously as possible.

The card access memory 21 is a memory for temporarily storing data to be recorded on the COMPACT FLASH™ 23.

The display memory 22 is a memory for storing image data to be displayed on the color monitor 18.

These memories 20–22 may be separate memory devices, or may consist of a single memory device.

Now, the microprocessor 25 exchanges control information with this image processing ASIC 16 and an image sensor driver 26. The microprocessor 25 also acquires operation information from an operating member 27 such as a release button and a command dial.

<<Correspondences between the Present Invention and the Present Embodiment>>

Hereinafter, description will be given of the correspondences between the configuration of the embodiment described above and the statements of the claims. Note that these correspondences simply provide an interpretation for reference purposes, and are not intended to limit the present invention.

The recording unit set forth in the claims corresponds to "the function of recording image data on the COMPACT FLASH™ 23 through a recording buffer" of the microprocessor 25.

The condition determining unit set forth in the claims corresponds to "the function of determining the right capacity of the recording buffer according to a recording test or information acquisition on the COMPACT FLASH™ 23" to be effected by the microprocessor 25.

The optimizing unit set forth in the claims corresponds to "the function of adjusting the area allocation of a virtual address space to change the capacity of the recording buffer" to be effected by the microprocessor 25.

The recording buffer set forth in the claims corresponds to the areas of the recording buffer to be allocated to the card access memory 21 and the like.

The data recorder set forth in the claims corresponds to a data recorder 30 (within the dotted box shown in FIG. 1).

The shooting unit set forth in the claims corresponds to the image sensor 13, the preprocessor 14, the A/D conversion unit 15, and the image processing ASIC 16.

The continuous shooting memory set forth in the claims corresponds to the continuous shooting memory 20.

The display memory set forth in the claims corresponds to the display memory 22.

The recording medium set forth in the claims corresponds to the program storing memory 24.

<<Description of the Operation of the Main Routine in the Present Embodiment>>

Figure 2:
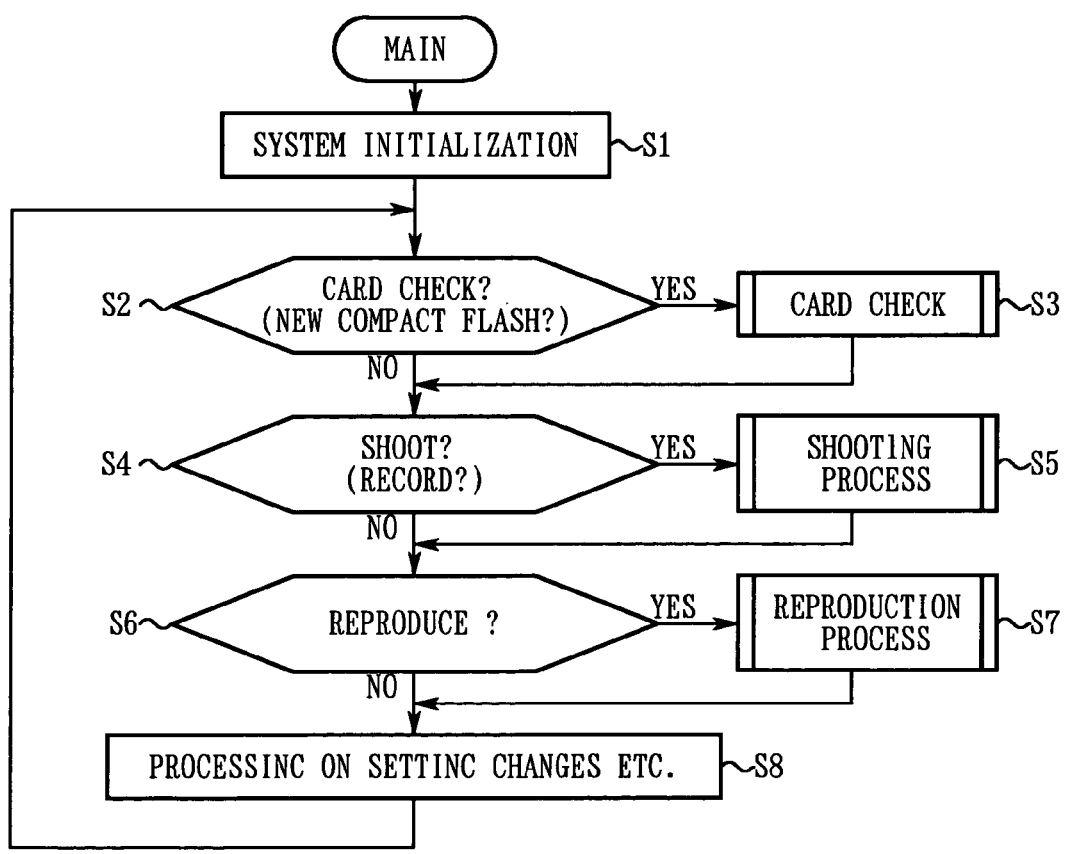
FIG. 2 is a flowchart explaining the operation of the main routine to be executed by the microprocessor 25.

Initially, a brief description will be given of the operation of the main routine in the present embodiment. FIG. 2 is a flowchart explaining the operation of the main routine to be executed by the microprocessor 25.

[Step S1] As the main power supply of the electronic camera 11 is turned on, the microprocessor 25 executes a predetermined initialization process.

[Step S2] The microprocessor 25 determines whether a card check is necessary or not. A card check is usually required when the main power supply is turned on or when a COMPACT FLASH™ 23 is loaded newly. If a card check is necessary, the microprocessor 25 moves the operation to step S3. On the other hand, if a card check is unnecessary, the microprocessor 25 moves the operation to step S4.

[Step S3] The microprocessor 25 performs a card check to be described later, thereby establishing area allocation for a recording buffer, a continuous shooting buffer, and a display buffer (see FIGS. 3 and 4).

[Step S4] When the electronic camera 11 is set in a shooting mode via the operating member 27, the microprocessor 25 moves the operation to step S5. Otherwise, the microprocessor 25 moves the operation to step S6.

[Step S5] The microprocessor 25 controls the image sensor 13 and others in accordance with a shooting request such as a release operation, to shoot a subject image. The image signal read from the image sensor 13 is passed through the preprocessor 14 and the A/D conversion unit 15 before temporarily stored into the continuous shooting buffer by the image processing ASIC 16. Such recording into the continuous shooting buffer is continued in response to consecutive shooting requests one by one until the image data in the continuous shooting buffer reaches the maximum number of continuous shots.

Meanwhile, the image processing ASIC 16 successively reads the image data in this continuous shooting buffer while executing a two-dimensional image process and a JPEG compression process, thereby generating image data for recording (i.e., JPEG-compressed file) in succession.

The microprocessor 25 activates a file recording task in parallel with such image processing. In this file recording task, the microprocessor 25 records the image data for recording, generated in succession, into the recording buffer successively. Moreover, the microprocessor 25 transfers a predetermined amount of image data from the recording buffer to the COMPACT FLASH™ 23 at a proper time available for a write to the COMPACT FLASH™ 23.

The series of operations described above completes the shooting process of the electronic camera 11.

[Step S6] When the electronic camera 11 is set in a reproduction mode via the operating member 27, the microprocessor 25 moves the operation to step S7. Otherwise, the microprocessor 25 moves the operation to step S8.

[Step S7] The microprocessor 25 opens an image file on the COMPACT FLASH™ 23 and reads the image data. The image processing ASIC 16 expands the read image data in JPEG format, and then converts the resolution of the data in agreement with a display resolution calculated by the card check. The resolution-converted image data is stored into the display buffer. The monitor display circuit in the image processing ASIC 16 periodically reads image data from this display buffer, and displays it as a reproduced image on the color monitor 18.

[Step S8] The microprocessor 25 changes various settings of the electronic camera 11 based on the operation information and the like from the operating member 27, and returns the operation to step S2.

<<Description of Card Check>>

Hereinafter, description will be given in detail of the operation of a card check, a feature of the present invention.

Figure 3:
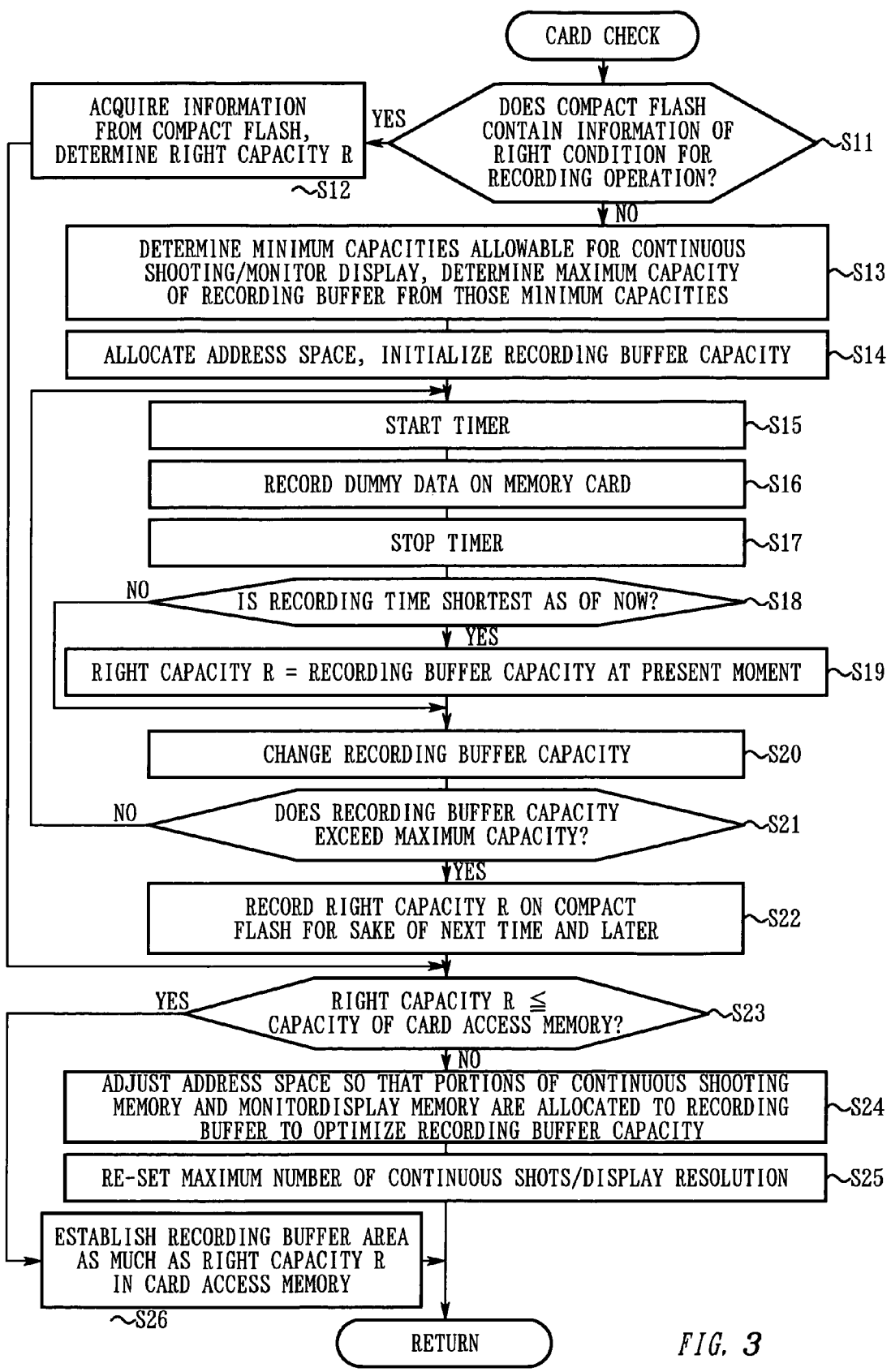
FIG. 3 is a flow chart explaining the operation of a card check to be executed by the microprocessor 25.

FIG. 3 is a flowchart explaining the operation of the card check to be executed by the microprocessor 25.

[Step S11] Initially, the microprocessor 25 determines whether or not the COMPACT FLASH™ 23 contains the information of a right condition for performing a recording operation. This information may be a right condition that is previously recorded at step S22 to be described later. It may be a right condition that is recorded at the time of shipment of the COMPACT FLASH™ 23. Incidentally, this information need not be the right condition itself, and may be some operating parameter from which the right condition can be determined.

Here, if there is the information of the right condition, the microprocessor 25 skips a recording test and moves the operation to step S12. If there is no right condition, the microprocessor 25 moves the operation to step S13 to start a recording test.

[Step S12] The microprocessor 25 determines the right condition (here, the right capacity R of the recording buffer) based on the information acquisition from the COMPACT FLASH™ 23. Then, the microprocessor 25 moves the operation to step S23.

[Step S13] The microprocessor 25 determines the minimum capacities allowable for continuous shooting and monitor display, from the settings of the electronic camera 11 or the like. Here, the minimum capacities are determined by the minimum number of continuous shots to be guaranteed, the minimum allowable display resolution, and the like. Based on these minimum capacities, the microprocessor 25 determines the maximum capacity allocable to the recording buffer.

Figure 4:
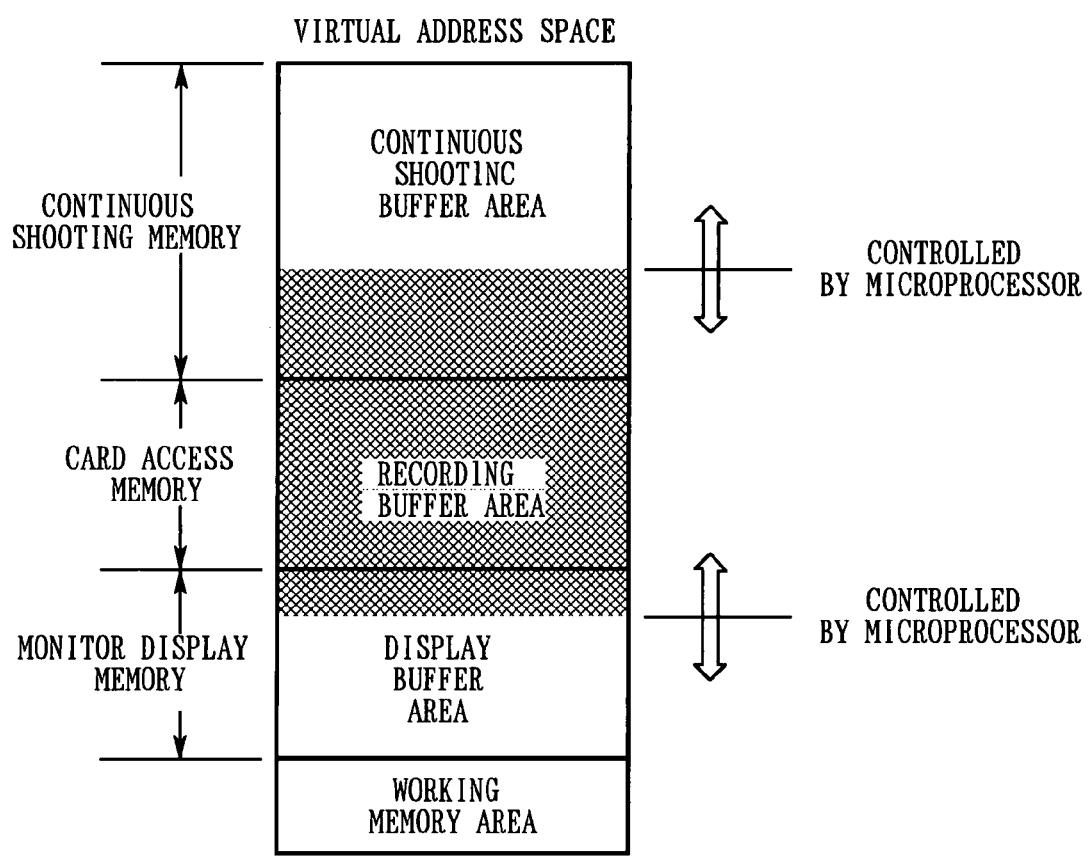
FIG. 4 is a diagram explaining the area allocation of an address space.

[Step S14] The microprocessor 25 allocates such a virtual address space as shown in FIG. 4, and sets the capacity of the recording buffer to an initial value (here, a minimum value).

[Step S15] The microprocessor 25 starts an internal timer to measure a recording time.

[Step S16] The microprocessor 25 records dummy data onto the COMPACT FLASH™ 23 through the recording buffer.

[Step S17] The microprocessor 25 waits for the completion of the recording on the COMPACT FLASH™ 23 before stops the internal timer and determines the recording time that is consumed to record the dummy data.

[Step S18] The microprocessor 25 determines whether or not the current recording time is the shortest as of this point in time. If the shortest, the microprocessor 25 moves the operation to step S19. If not, the microprocessor 25 moves the operation to step S20. Incidentally, if this is the first measurement, the microprocessor 25 decides that it is the shortest, and moves the operation to step S19.

[Step S19] The capacity of the recording buffer at the present moment is provisionally recorded as the right capacity R.

[Step S20] The microprocessor 25 extends the area of the recording buffer in predetermined steps over the virtual address space shown in FIG. 4.

[Step S21] The microprocessor 25 determines whether or not the recording buffer exceeds the maximum capacity determined at step S13.

If the maximum capacity is not exceeded, the microprocessor 25 determines that the recording test is yet to be completed, and returns the operation to step S15. As a result, the loop operation in the range of steps S15–S21 is repeated until the recording buffer exceeds the maximum capacity.

Now, if the recording buffer exceeds the maximum capacity, the microprocessor 25 determines that the recording test is completed, and moves the operation to step S22.

[Step S22] At the completion of the recording test, the right capacity R stores the recording buffer capacity at which the recording time to the COMPACT FLASH™ 23 becomes the shortest. The microprocessor 25 records this right capacity R on the COMPACT FLASH™ 23 as the right condition.

[Step S23] The microprocessor 25 compares the right capacity R and the capacity of the card access memory 21. If the right capacity R is smaller or equal, the microprocessor 25 moves the operation to step S26. In contrast, if the right capacity R is greater, the microprocessor 25 moves the operation to step S24.

[Step S24] The boundaries on the address space shown in FIG. 4 are adjusted to allocate portions of the areas of the continuous shooting memory 20 and display memory 22 to the recording buffer, thereby securing the recording buffer area as much as the right capacity R. Here, the boundaries are adjusted within such an extent that neither the continuous shooting buffer area nor the display buffer area falls below the respective minimum capacities determined at step S13.

[Step S25] The microprocessor 25 re-sets the maximum number of continuous shots based on the capacity of the continuous shooting buffer area. Besides, the microprocessor re-sets the display resolution based on the capacity of the display buffer area. After the completion of the foregoing processes, the operation of the card check terminates.

[Step S26] The microprocessor 25 reserves the recording buffer area as much as the right capacity R within the card access memory 21. After such processing, the operation of the card check terminates.

<<Effect of the Embodiment>>

Through the operations described above, the present embodiment adjusts the capacity of the recording buffer so as to make the recording time to the COMPACT FLASH™ 23 the shortest. This allows immediate improvements in the timing of the recording operation on the electronic-camera side, the frequency of overflows of the recording buffer, and the like in response to a wide variety of COMPACT FLASHES™ 23. As a result, the shooting and recording time of the electronic camera can be reduced with reliability.

In particular, according to the present embodiment, portions of the areas of the continuous shooting memory 20 and the display memory 22 are utilized for the recording buffer. This gives the recording buffer an extremely wide range of capacity variation. Accordingly, the recording buffer has a higher opportunity of being adjusted to the optimum capacity, which allows a further reduction in the shooting and recording time of the electronic camera.

Moreover, according to the present embodiment, the right condition determined through the recording test performed on a recording medium is recorded on that recording medium. This makes it possible to omit the next and subsequent recording tests on that recording medium.

<<Supplemental Remarks on the Embodiment>>

The embodiment described above uses a COMPACT FLASH™ as the removable recording medium. This COMPACT FLASH™ has the function of internal intelligent recording control, and involves the special circumstance that the sequence of the recording control varies intricately from one product to another. Thus, in the present embodiment, precisely adjusting the timing of the electronic camera to the intricate recording control inside a COMPACT FLASH™ yields the advantage of a significant reduction in the recording time.

However, the removable recording medium is not limited to a COMPACT FLASH™. In general, any recording medium is applicable as long as the recording operation thereto can be optimized by changing the timing of the recording operation on the recorder side.

Moreover, the foregoing embodiment has dealt with the embodiment of an electronic camera. However, the present invention is not limited thereto. For example, the present invention is also applicable to an apparatus for recording MP3 or other music data.

The foregoing embodiment has dealt with the case where the program recording medium is the program storing memory 24. However, the program recording medium is not limited to this form. Any machine-readable recording media are applicable including system memories, hard disks, and nonvolatile recording media (such as CD-ROM), for example.

The invention is not restricted to the foregoing embodiment in practicing the recording medium. For example, the program may be delivered over a communication line so that the computer on the other end stores the program on its system memory, hard disk, or the like. In this case, the delivering party of the program can fabricate a recording medium containing the program at the point of the other party. Such a delivery of the program also allows the just-fabricated recording medium of the program to be assigned to the other party at the location of the other party. Moreover, assignment of a recording medium as described above may be offered by announcing to the public over communication lines the fact that the program is deliverable, or providing the information of the location that the program is stored.

The invention is not limited to the above embodiments and various modifications may be made without departing from the spirit and scope of the invention. Any improvement may be made in part or all of the components.

What is claimed is:

1. An electronic camera comprising:
a shooting unit for shooting a subject image to generate image data;
a continuous shooting memory for temporarily storing said image data yet to be completed of processing; and
a data recorder for recording image data generated by said shooting unit, the data recorder including a recording unit for recording data on a removable recording medium, and including a recording buffer for temporarily storing data yet to be output to said recording medium, a condition determining unit for determining a right condition for performing a recording operation with said recording unit according to a recording test performed on said recording medium, and an optimizing unit for optimizing the recording operation of said recording unit according to said right condition determined by said condition determining unit, optimizing the capacity of said recording buffer according to said right condition, and
optimizing the capacity of said recording buffer by allocating an area of said continuous shooting memory to said recording buffer according to said right condition.

2. An electronic camera comprising:
a shooting unit for shooting a subject image to generate image data;
a continuous shooting memory for temporarily storing said image data yet to be completed of processing; and
a data recorder for recording image data generated by said shooting unit, the data recorder including a recording unit for recording data on a removable recording medium, and including a recording buffer for temporarily storing data yet to be output to said recording medium, a condition determining unit for determining a right condition for performing a recording operation with said recording unit according to information acquisition from said recording medium, and an optimizing unit for optimizing the recording operation of said recording unit according to said right condition determined by said condition determining unit, optimizing the capacity of said recording buffer according to said right condition, and
optimizing the capacity of said recording buffer by allocating an area of said continuous shooting memory to said recording buffer according to said right condition.

3. An electronic camera comprising:
a shooting unit for shooting a subject image to generate image data;
a display memory for storing said image data for displaying purpose; and
a data recorder for recording image data generated by said shooting unit, the data recorder including a recording unit for recording data on a removable recording medium, and including a recording buffer for temporarily storing data yet to be output to said recording medium, a condition determining unit for determining a right condition for performing a recording operation with said recording unit according to a recording test performed on said recording medium, and an optimizing unit for optimizing the recording operation of said recording unit according to said right condition determined by said condition determining unit, optimizing the capacity of said recording buffer according to said right condition, and
optimizing the capacity of said recording buffer by allocating an area of said display memory to said recording buffer according to said right condition.

4. An electronic camera comprising:
a shooting unit for shooting a subject image to generate image data;
a display memory for storing said image data for displaying purpose; and
a data recorder for recording image data generated by said shooting unit, the data recorder including a recording unit for recording data on a removable recording medium, and including a recording buffer for temporarily storing data yet to be output to said recording medium, a condition determining unit for determining a right condition for performing a recording operation with said recording unit according to information acquisition from said recording medium, and an optimizing unit for optimizing the recording operation of said recording unit according to said right condition determined by said condition determining unit, optimizing the capacity of said recording buffer according to said right condition, and
optimizing the capacity of said recording buffer by allocating an area of said display memory to said recording buffer according to said right condition.

* * * * *